United States Patent
Han et al.

(10) Patent No.: US 9,684,419 B2
(45) Date of Patent: Jun. 20, 2017

(54) TOUCH SENSOR INTEGRATED TYPE DISPLAY DEVICE

(71) Applicant: LG Display Co., Ltd., Seoul (KR)

(72) Inventors: Manhyeop Han, Seoul (KR);
Seungkyeom Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 84 days.

(21) Appl. No.: 14/547,361

(22) Filed: Nov. 19, 2014

(65) Prior Publication Data

US 2015/0153877 A1 Jun. 4, 2015

(30) Foreign Application Priority Data

Dec. 2, 2013 (KR) .................. 10-2013-0148517

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04111* (2013.01)

(58) Field of Classification Search
None
See application file for complete search history.

(56) References Cited

U.S. PATENT DOCUMENTS

| 7,859,521 B2 | 12/2010 | Hotelling et al. |
| 2010/0182259 A1 | 7/2010 | Jung et al. |
| 2011/0254778 A1 | 10/2011 | Wang et al. |
| 2014/0062943 A1* | 3/2014 | Choi ............... G06F 3/0412 345/174 |
| 2014/0118299 A1* | 5/2014 | Wang ............... G06F 3/0416 345/174 |
| 2014/0125626 A1* | 5/2014 | Yang ............... G02F 1/134336 345/174 |
| 2014/0160066 A1 | 6/2014 | Kim et al. |

(Continued)

FOREIGN PATENT DOCUMENTS

| CN | 102955637 A | 3/2013 |
| JP | 2010-165332 A | 7/2010 |

(Continued)

OTHER PUBLICATIONS

Extended European Search Report dated May 20, 2015, for the European patent application No. 14194882.8.

(Continued)

*Primary Examiner* — Ryan A Lubit
(74) *Attorney, Agent, or Firm* — Morgan, Lewis & Bockius LLP

(57) ABSTRACT

A touch sensor integrated type display device capable of recognizing a user's touch operation is disclosed. The touch sensor integrated type display device includes a plurality of first electrodes each including a plurality of first electrode patterns, which are connected through a plurality of first bottlenecks, the plurality of first electrodes being arranged in a first direction, and a plurality of second electrodes arranged in a second direction crossing the first direction. The plurality of first electrode patterns and the plurality of second electrodes are alternately disposed. At least one unit pixel electrode is disposed corresponding to each of the plurality of first electrode patterns.

7 Claims, 14 Drawing Sheets

(56) References Cited

U.S. PATENT DOCUMENTS

| 2014/0176465 | A1* | 6/2014 | Ma | G06F 3/041 |
| | | | | 345/173 |
| 2015/0268762 | A1* | 9/2015 | Wang | G06F 3/0412 |
| | | | | 345/174 |
| 2015/0309644 | A1* | 10/2015 | Sun | G06F 3/0412 |
| | | | | 345/173 |

FOREIGN PATENT DOCUMENTS

| KR | 10-1318448 B1 | 10/2013 |
| TW | 201137688 A | 11/2011 |

OTHER PUBLICATIONS

Office Action issued in corresponding Japanese Patent Application No. 2014-239590 dated Dec. 15, 2015.
Taiwanese Office Action dated Nov. 3, 2015, for corresponding Patent Application No. 103137056.

\* cited by examiner

TOUCH SENSOR INTEGRATED TYPE DISPLAY DEVICE

This application claims the benefit of priority under 35 U.S.C. §119(a) to Korean Patent Application No. 10-2013-0148517 filed on Dec. 2, 2013, which is incorporated by reference herein in its entirety.

BACKGROUND OF THE INVENTION

Field of the Invention

The present disclosure relates to a display device, and more particularly, to a touch sensor integrated type display device capable of recognizing a user's touch operation.

Discussion of the Related Art

In recent years, various input devices, such as a keyboard, a mouse, a joystick, and a digitizer, have been used to allow users to interface with home appliances or information telecommunication devices. However, when the user makes use of these input devices, user's dissatisfaction increases because the user is required to learn how to use the input devices and the input devices occupy space. Therefore, a convenient and simple input device capable of reducing erroneous operations is required. In response to this demand, a touch sensor for enabling the user to input information by directly touching the screen with his or her hand or a pen was suggested.

The touch sensor has a simple configuration capable of reducing the erroneous operations. The user can also perform an input action without using a separate input device and can quickly and easily manipulate a display device through the contents displayed on the screen. Accordingly, the touch sensor has been applied to various display devices.

The touch sensor used in the display devices may be classified into an add-on type touch sensor and an on-cell type touch sensor. The add-on type touch sensor is configured such that a display device and a touch sensor are individually manufactured and then the touch sensor is attached to an upper substrate of the display device. The on-cell type touch sensor is configured such that components constituting a touch sensor are directly formed on the surface of an upper glass substrate of the display device.

There is a problem of an increase in a thickness of the display device because the add-on type touch sensor has a structure in which the touch sensor is mounted on the display device. Further, the visibility of the display device is reduced by a reduction in brightness of the display device resulting from the increase in the thickness of the display device.

On the other hand, the on-cell type touch sensor shares a glass substrate with the display device because the touch sensor has the structure in which the touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor. Further, the number of processes for manufacturing the display device using the on-cell type touch sensor has increased, and thus the manufacturing cost increases.

Accordingly, the need for a touch sensor integrated type display device capable of solving the above-described problems has arisen. An example of the touch sensor integrated type display device includes U.S. Pat. No. 7,859,521.

A touch sensor integrated type display device disclosed in U.S. Pat. No. 7,859,521 divides a common electrode of the display device and allows the common electrodes to serve as touch driving electrodes and touch sensing electrodes. Hence, the touch sensor integrated type display device disclosed in U.S. Pat. No. 7,859,521 measures changes in a mutual capacitance generated in a touch operation and recognizes a touch or non-touch input and a touch position in the touch input.

In the above configuration of the touch sensor integrated type display device, because the touch driving electrodes and the touch sensing electrodes are formed on the same layer, the touch driving electrodes and the touch sensing electrodes are each interconnected by wires according to their functions, so as to avoid contact with different types of electrodes. Namely, the touch driving electrodes are connected to touch driving electrode wires through driving electrode contact holes, and the touch sensing electrodes are connected to touch sensing electrode wires through sensing electrode contact holes. Hence, the touch driving electrodes and the touch sensing electrodes do not electrically contact each other.

However, the touch sensor integrated type display device disclosed in U.S. Pat. No. 7,859,521 has the complex structure, in which both the touch driving electrode and the touch sensing electrode have to be formed on a single common electrode layer, and also separate wires and separate contact holes are required to connect the divided driving electrodes.

As described above, the related art touch sensor integrated type display device had problems of the complex design and a reduction in the display characteristic because of the complex structure, in which various types of display pixels are formed corresponding to a unit touch electrode.

SUMMARY OF THE INVENTION

Accordingly, the present invention is directed to a touch sensor integrated type display device that substantially obviates one or more of the problems due to limitations and disadvantages of the related art.

An object of the present invention is provide a touch sensor integrated type display device capable of preventing a reduction in display characteristic by simply and efficiently forming complex wires for touch driving electrodes and touch sensing electrodes.

Another object of the present invention is to provide a touch sensor integrated type display device capable of improving an aperture ratio by removing a contact hole for connecting connection wires of a touch driving electrode and a touch sensing electrode.

Another object of the present invention is to provide a touch sensor integrated type display device capable of improving a touch performance by reducing an initial mutual capacitance between a touch driving electrode and a touch sensing electrode and a parasitic capacitance between a signal wire and a touch electrode.

Additional features and advantage of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensor integrated type display device comprises a plurality of first electrodes each including a plurality of first electrode patterns, which are connected through a plurality of first bottlenecks, the plurality of first electrodes being arranged in a first direction, and a plurality of second electrodes arranged in a second direction crossing the first direction, wherein the plurality of first electrode patterns and the plurality of second electrodes are alternately disposed, wherein at least one unit pixel electrode is disposed corresponding to each of the plurality of first electrode patterns.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
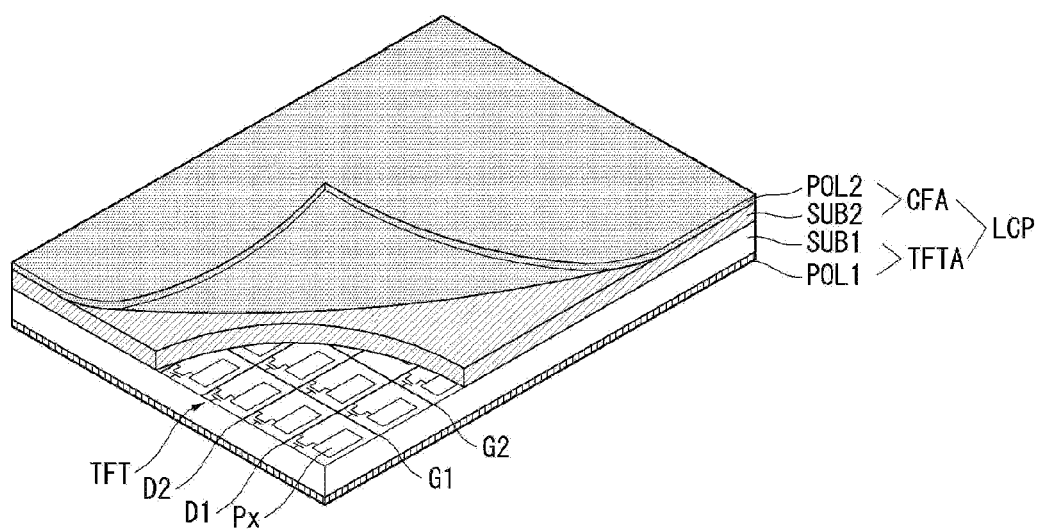
FIG. 1 is a partial exploded perspective view schematically showing a touch sensor integrated type display device according to embodiments of the invention.
Figure 2:
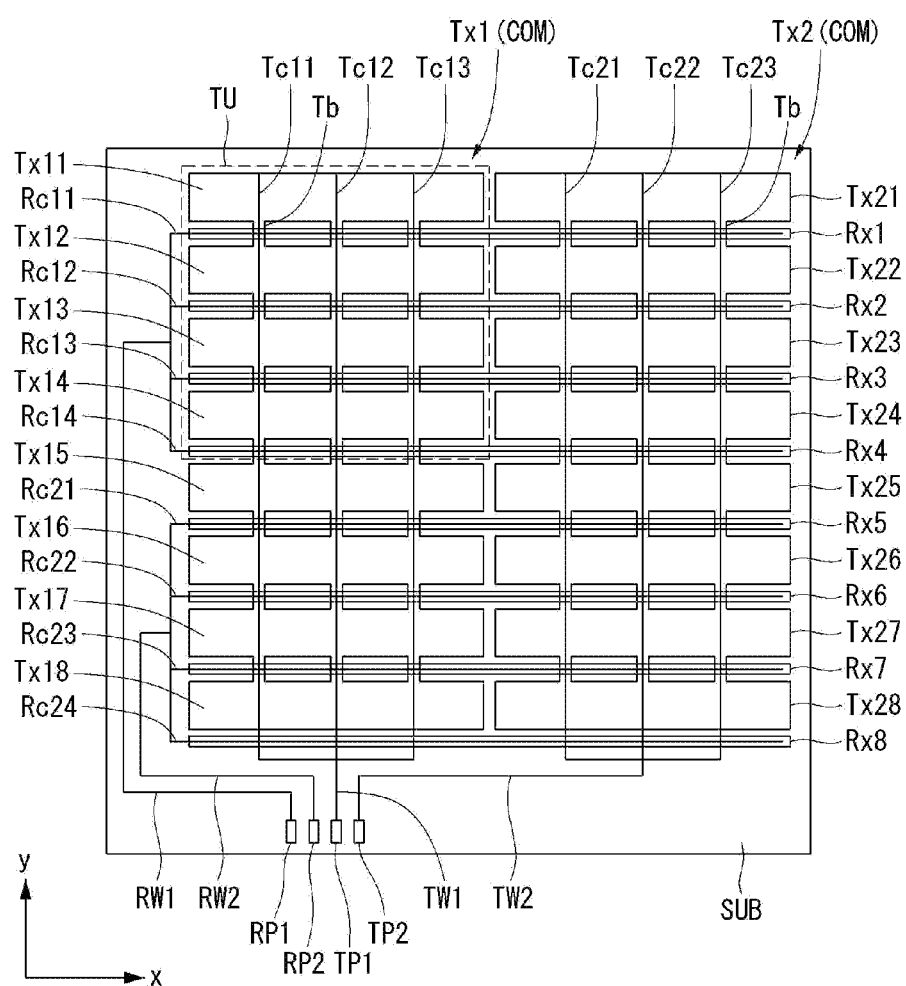
FIG. 2 is a plane view schematically showing a relationship between a touch driving electrode serving as a common electrode and a touch sensing electrode in a touch sensor integrated type display device according to a first embodiment of the invention.

A touch sensor integrated type display device according to an exemplary embodiment of the invention is described with reference to FIGS. 1 and 2. FIG. 1 is a partial exploded perspective view schematically showing a touch sensor integrated type display device according to embodiments of the invention. FIG. 2 is a plane view schematically showing a relationship between a touch driving electrode serving as a common electrode and a touch sensing electrode in a touch sensor integrated type display device according to a first embodiment of the invention.

As shown in FIG. 1, the touch sensor integrated type display device according to the embodiments of the invention includes a liquid crystal display panel LCP having a thin film transistor (TFT) array TFTA and a color filter array CFA which are positioned opposite each other with a liquid crystal layer (not shown) interposed therebetween.

The TFT array TFTA includes a plurality of gate lines G1 and G2 which are formed in parallel in a first direction (for example, x-axis direction) on a first substrate SUB1, a plurality of data lines D1 and D2 which are formed in parallel in a second direction (for example, y-axis direction) to cross over the plurality of gate lines G1 and G2, liquid crystal cells positioned in areas defined by the crossing of the gate lines G1 and G2 and the data lines D1 and D2, thin film transistors TFT formed at crossings of the gate lines G1 and G2 and the data lines D1 and D2, a plurality of pixel electrodes Px for charging the liquid crystal cells to a data voltage, and a plurality of common electrodes (not shown) which are disposed to form an electric field along with the plurality of pixel electrodes Px.

The color filter array CFA includes black matrixes (not shown) and color filters (not shown), which are formed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the TFT array TFTA and the color filter array CFA of the liquid crystal display panel LCP to maintain cell gaps of the liquid crystal cells.

The common electrodes are formed on the second substrate SUB2 in a vertical electric field driving manner such as a twisted nematic (TN) mode and a vertical alignment (VA) mode. Further, the common electrodes are formed on the first substrate SUB1 along with the pixel electrodes Px in a horizontal electric field driving manner such as an in-plane switching (IPS) mode and a fringe field switching (FFS) mode. In the following description, the embodiment of the invention is described based on the horizontal electric field driving manner as an example.

As shown in FIG. 2, a common electrode COM of the touch sensor integrated type display device according to the first embodiment of the invention includes a plurality of electrodes Tx1 and Tx2 which are divided in a first direction (for example, x-axis direction or y-axis direction) or a second direction (for example, y-axis direction or x-axis direction). In the embodiment disclosed herein, for example, the first direction indicates the x-axis direction, and the second direction denotes the y-axis direction. In the first embodiment of the invention shown in FIG. 2, the divided common electrodes Tx1 and Tx2 are arranged in the second direction (i.e., y-axis direction) and form a plurality of columns. Further, the divided common electrodes Tx1 and Tx2 serve as a plurality of touch driving electrodes constituting a touch sensor.

Each of the plurality of touch driving electrodes Tx1 and Tx2 includes a plurality of bottlenecks Tb which are arranged in parallel in the x-axis direction along the y-axis direction at crossings of the plurality of touch driving electrodes Tx1 and Tx2 and a plurality of touch sensing electrodes Rx1 to Rx8 and each have a narrow width. More specifically, the first touch driving electrode Tx1 is configured such that a plurality of first touch driving electrode patterns Tx11 to Tx18 arranged in the x-axis direction along the y-axis direction are connected through the bottlenecks Tb. Further, the second touch driving electrode Tx2 is configured such that a plurality of second touch driving electrode patterns Tx21 to Tx28 arranged in the x-axis direction along the y-axis direction are connected through the bottlenecks Tb in the same manner as the first touch driving electrode Tx1.

First and second touch driving electrode resistance reducing wires Tc11 to Tc13 and Tc21 to Tc23 are respectively disposed on the first and second touch driving electrodes Tx1 and Tx2, so that the wires Tc11 to Tc13 and Tc21 to Tc23 pass through the bottlenecks Tb arranged in the y-axis direction. More specifically, the first touch driving electrode resistance reducing wires Tc11 to Tc13 are disposed so that they pass through the first touch driving electrode patterns Tx11 to Tx18 and the bottlenecks Tb of the y-axis direction connecting the first touch driving electrode patterns Tx11 to Tx18. Further, the second touch driving electrode resistance reducing wires Tc21 to Tc23 are disposed so that they pass through the second touch driving electrode patterns Tx21 to Tx28 and the bottlenecks Tb of the y-axis direction connecting the second touch driving electrode patterns Tx21 to Tx28. The first touch driving electrode resistance reducing wires Tc11 to Tc13 directly contact the first touch driving electrode Tx1 and thus reduce a resistance of the first touch driving electrode Tx1 formed of a transparent conductive material with a high resistance. The second touch driving electrode resistance reducing wires Tc21 to Tc23 directly contact the second touch driving electrode Tx2 and thus reduce a resistance of the second touch driving electrode Tx2 formed of a transparent conductive material with a high resistance.

The first touch driving electrode resistance reducing wires Tc11 to Tc13 are connected to one component outside an area, in which the touch driving electrodes Tx1 and Tx2 and the touch sensing electrodes Rx1 to Rx8 are formed, and are connected to a first touch driving routing pad TP1 through a first touch driving routing wire TW1. The second touch driving electrode resistance reducing wires Tc21 to Tc23 are connected to one component outside the area, in which the touch driving electrodes Tx1 and Tx2 and the touch sensing electrodes Rx1 to Rx8 are formed, and are connected to a second touch driving routing pad TP2 through a second touch driving routing wire TW2.

The first embodiment of the invention shown in FIG. 2 shows an example where the touch driving electrodes are implemented as two touch driving lines, namely, a first touch driving line including the first touch driving electrode Tx1 and the first touch driving electrode resistance reducing wires Tc11 to Tc13 and a second touch driving line including the second touch driving electrode Tx2 and the second touch driving electrode resistance reducing wires Tc21 to Tc23.

Further, the first embodiment of the invention shown in FIG. 2 shows an example where the three first touch driving electrode resistance reducing wires Tc11 to Tc13 are used to form the first touch driving line, and the three second touch driving electrode resistance reducing wires Tc21 to Tc23 are used to form the second touch driving line. However, the embodiment of the invention is not limited thereto. For example, one or two touch driving electrode resistance reducing wire(s) may be used, or four or more touch driving electrode resistance reducing wires may be used.

The touch sensing electrodes Rx1 to Rx8 constituting the touch sensor are arranged in the x-axis direction between the touch driving electrode patterns (i.e., between Tx11, Tx21 and Tx12, Tx22, between Tx12, Tx22 and Tx13, Tx23, between Tx13, Tx23 and Tx14, Tx24, between Tx14, Tx24 and Tx15, Tx25, between Tx15, Tx25 and Tx16, Tx26, between Tx16, Tx26 and Tx17, Tx27, and between Tx17, Tx27 and Tx18, Tx28) which are adjacent to each other in the y-axis direction, and on the lower side of the lowermost touch driving electrode patterns Tx18 and Tx28, so that the touch sensing electrodes Rx1 to Rx8 cross over the bottlenecks Tb and the first and second touch driving electrode resistance reducing wires Tc11 to Tc13 and Tc21 to Tc23.

First to eighth touch sensing electrode resistance reducing wires Rc11 to Rc14 and Rc21 to Rc24 for the resistance reduction are respectively formed on the touch sensing electrodes Rx1 to Rx8. The touch sensing electrodes Rx1 to Rx8 are separated from one another. The first to fourth touch sensing electrodes Rx1 to Rx4 and the first to fourth touch sensing electrode resistance reducing wires Rc11 to Rc14 respectively contacting the first to fourth touch sensing electrodes Rx1 to Rx4 are grouped to form a first touch sensing line, and the fifth to eighth touch sensing electrodes Rx5 to Rx8 and the fifth to eighth touch sensing electrode resistance reducing wires Rc21 to Rc24 respectively contacting the fifth to eighth touch sensing electrodes Rx5 to Rx8 are grouped to form a second touch sensing line.

The first touch sensing line (Rx1 to Rx4 and Rc11 to Rc14) is connected to one component outside the area, in which the touch driving electrodes Tx1 and Tx2 and the touch sensing electrodes Rx1 to Rx8 are formed, and is connected to a first touch sensing routing pad RP1 through a first touch sensing routing wire RW1. The second touch sensing line (Rx5 to Rx8 and Rc21 to Rc24) is connected to one component outside the area, in which the touch driving electrodes Tx1 and Tx2 and the touch sensing electrodes Rx1 to Rx8 are formed, and is connected to a second touch sensing routing pad RP2 through a second touch sensing routing wire RW2.

As described above, the touch sensor integrated type display device according to the first embodiment of the invention includes the first and second touch driving electrodes Tx1 and Tx2 and the first to eighth touch sensing electrodes Rx1 to Rx8. As shown in FIG. 2, the plurality of touch driving electrodes Tx1 and Tx2 and the plurality of touch sensing electrodes Rx1 to Rx8 may be properly grouped using the first and second touch driving electrode resistance reducing wires Tc11 to Tc13 and Tc21 to Tc23 and the first to eighth touch sensing electrode resistance reducing wires Rc11 to Rc14 and Rc21 to Rc24 to unit touch recognition blocks TU for the touch recognition. FIG. 2 shows an example where the two touch driving electrodes Tx1 and Tx2 and the eight touch sensing electrodes Rx1 to Rx8 form the four unit touch recognition blocks TU.

All of the above-described touch driving electrodes Tx1 and Tx2 also serve as the common electrode COM and are formed on the first substrate SUB1 of the TFT array TFTA along with the pixel electrodes Px in the horizontal electric field driving manner. The pixel electrodes Px are formed in areas defined by the crossing of the gate lines and the data lines.

Each of the first and second touch driving electrode patterns Tx11 to Tx18 and Tx21 to Tx28 serving as the common electrode COM may be formed correspondingly to a plurality of unit pixel electrodes (each including a plurality of subpixels required to represent color) of one line.

As described above, in the touch sensor integrated type display device according to the first embodiment of the invention, each of the first and second touch driving electrode patterns Tx11 to Tx18 and Tx21 to Tx28 may be formed correspondingly to the plurality of unit pixel electrodes of one line. Further, each of the first and second touch driving electrode resistance reducing wires Tc11 to Tc13 and Tc21 to Tc23 may be formed correspondingly to one data line or n data lines, where n is a natural number equal to or greater than 2. Further, each of the touch sensing electrodes Rx1 to Rx8 may be formed correspondingly to one gate line or n gate lines.

Figure 3:
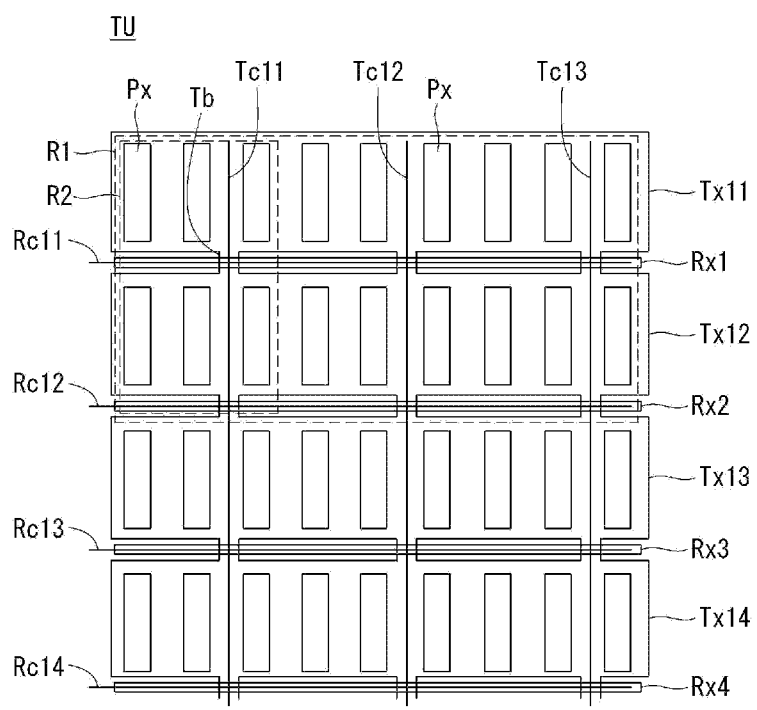
FIG. 3 is a plane view schematically showing a relationship between pixel electrodes and common electrodes (touch driving electrodes or touch sensing electrodes) in a unit touch recognition block TU shown in FIG. 2.
Figure 4:
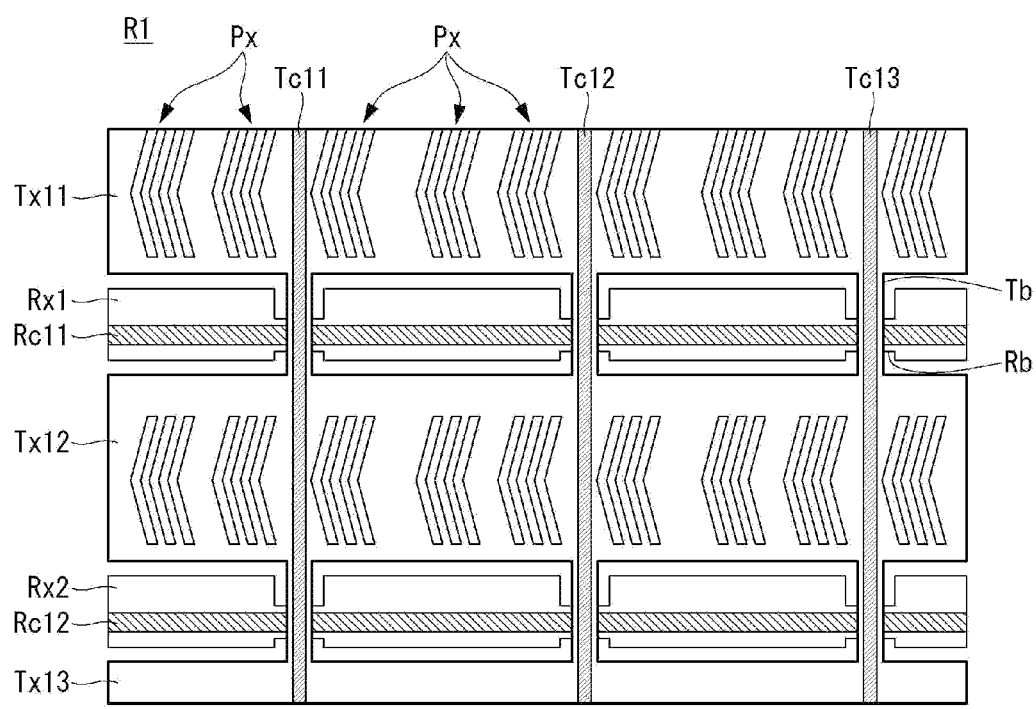
FIG. 4 is a plane view schematically showing a relationship between common electrodes (touch driving electrodes), touch sensing electrodes, and pixel electrodes in a region R1 shown in FIG. 3 in a touch sensor integrated type display device according to a first embodiment of the invention.

A relationship between the common electrodes (the touch driving electrodes), the touch sensing electrodes, and the pixel electrodes in the touch sensor integrated type display device according to the first embodiment of the invention is described in detail below with reference to FIGS. 3 and 4. FIG. 3 is a plane view schematically showing a relationship between the pixel electrodes and the common electrodes (the touch driving electrodes) in the unit touch recognition block TU shown in FIG. 2. FIG. 4 is a plane view schematically showing a relationship between the common electrodes (the touch driving electrodes), the touch sensing electrodes, and the pixel electrodes in a region R1 shown in FIG. 3 in the touch sensor integrated type display device according to the first embodiment of the invention. Other components (for example, the thin film transistors, the gate lines, and the data lines, etc.) for driving the display device are omitted in FIGS. 3 and 4 for the sake of simplicity of the drawing.

As shown in FIGS. 3 and 4, the plurality of pixel electrodes Px are arranged in parallel in each of the first touch driving electrode patterns Tx11 to Tx18 along an arrangement direction of the touch driving electrode patterns Tx11 to Tx18. Namely, the plurality of unit pixel electrodes are arranged in a line in the x-axis direction in each of the first touch driving electrode patterns Tx11 to Tx18, and the unit pixel electrodes Px of one line are formed in each of the touch driving electrode patterns Tx11 to Tx18.

Figure 5A:
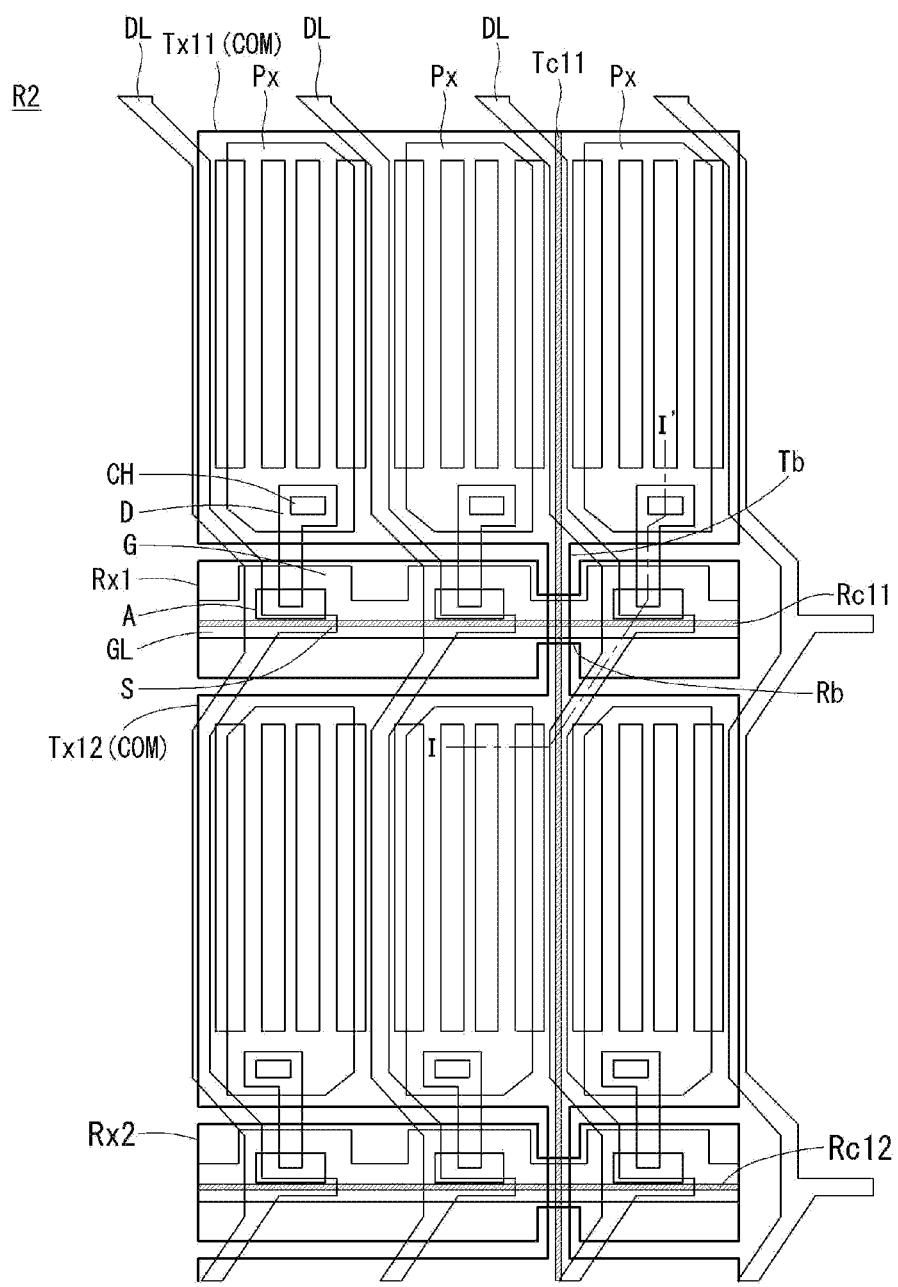
FIG. 5A is a plane view showing an example where a common electrode is formed on a pixel electrode in a region R2 shown in FIG. 3.
Figure 5B:
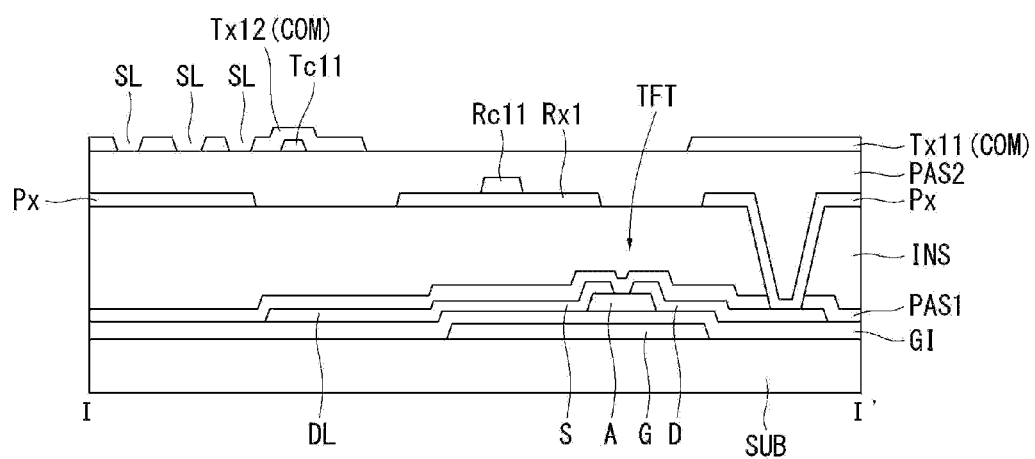
FIG. 5B is a cross-sectional view taken along line I-I' of FIG. 5A.

Next, the touch sensor integrated type display device according to the first embodiment of the invention, in which the common electrode (the touch driving electrode) is formed on the pixel electrode, is described with reference to FIGS. 5A and 5B. FIG. 5A is a plane view showing an example where the common electrode is formed on the pixel electrode in a region R2 shown in FIG. 3. FIG. 5B is a cross-sectional view taken along line I-I' of FIG. 5A.

For the sake of simplicity, the following description will be given focusing on the pixel electrodes Px disposed in the region R2 of FIG. 3 including a partial area of the two touch driving electrode patterns Tx11 and Tx12, which are adjacent to each other in the y-axis direction, and a partial area of the two touch sensing electrodes Rx1 and Rx2 adjacent to the touch driving electrode patterns Tx11 and Tx12. In the embodiment of the invention, 'Px' denotes the subpixels required to represent the color, three subpixels form one unit pixel electrode, and each subpixel is simply referred to as the pixel electrode.

As shown in FIGS. 4, 5A, and 5B, the touch sensor integrated type display device according to the first embodiment of the invention includes gate lines GL and data lines DL formed to cross over each other on a substrate SUB1 of a thin film transistor array TFTA, thin film transistors TFT formed at crossings of the gate lines GL and the data lines DL, pixel electrodes Px formed in areas defined by the crossing of the gate lines GL and the data lines DL, and common electrodes COM positioned opposite the pixel electrodes Px. In the first embodiment of the invention, the common electrodes COM serve as touch driving electrodes Tx. Thus, the common electrode COM is hereinafter referred to as the touch driving electrode Tx, the touch driving electrode Tx serving as the common electrode, or the common electrode COM serving as the touch driving electrode, if necessary or desired.

In the above configuration of the display device, the gate line GL is formed on the substrate SUB1, and a gate insulating layer GI is formed on the gate line GL. An active layer A, a source electrode S, and a drain electrode D constituting the thin film transistor TFT are formed on the gate insulating layer GI.

Namely, the thin film transistor TFT includes a gate electrode G extending from the gate line GL formed on the substrate SUB1, the active layer A formed in an area corresponding to the gate electrode G on the gate insulating layer GI covering the gate line GL and the gate electrode G, and the source electrode S and the drain electrode D which are separated from each other on the gate insulating layer GI and extend from the data line DL, so as to expose a portion of the active layer A.

The embodiment of the invention has described as an example a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is well known, a detailed description thereof will be omitted.

A first passivation layer PAS1 covering the thin film transistor TFT and the data line DL is formed on the gate insulating layer GI, on which the thin film transistor TFT and the data line DL are formed, and an organic insulating layer INS, such as photoacryl, for planarization is formed on the first passivation layer PAS1. A contact hole CH exposing a portion of the drain electrode D is formed in the organic insulating layer INS and the first passivation layer PAS1.

The pixel electrodes Px are formed on the organic insulating layer INS and are respectively arranged in pixel areas defined by the crossing of the data lines DL and the gate lines GL. The pixel electrode Px is formed so that it contacts the drain electrode D of the thin film transistor TFT through the contact hole CH passing through the organic insulating layer INS and the first passivation layer PAS1. Touch sensing electrodes Rx1 and Rx2 are formed on the organic insulating layer INS in parallel with the gate line GL and are positioned between the adjacent pixel electrodes Px arranged in the y-axis direction. Each of the touch sensing electrodes Rx1 and Rx2 includes a bottleneck Rb having a narrow width at a crossing of a bottleneck Tb of the touch driving electrode and the touch sensing electrode. Touch sensing electrode resistance reducing wires Rc11 and Rc12 are respectively formed on the touch sensing electrodes Rx1 and Rx2 in parallel with the gate line GL.

A second passivation layer PAS2 is formed on the organic insulating layer INS, on which the pixel electrodes Px, the touch driving electrode patterns Tx11 and Tx12, and the touch sensing electrode resistance reducing wires Rc11 and Rc12 are formed.

The touch driving electrode resistance reducing wire Tc11 is formed on the second passivation layer PAS2 and overlaps the data line DL. The touch driving electrode resistance reducing wire Tc11 is formed to pass through the bottleneck Rb of the touch sensing electrode.

The touch driving electrode patterns Tx11 and Tx12 serving as the common electrode are formed on the second passivation layer PAS2, on which the touch driving electrode resistance reducing wire Tc11 is formed. The touch driving electrode patterns Tx11 and Tx12 are formed to overlap the pixel electrode Px. Each of the touch driving electrode patterns Tx11 and Tx12 includes a plurality of slits SL, so that a horizontal electric field is easily formed between the pixel electrodes Px and the touch driving electrode patterns. Thus, the pixel electrodes Px formed on the organic insulating layer INS do not have the slit, and the touch driving electrode patterns Tx11 and Tx12 formed on the second passivation layer PAS2 each have the slits.

Figure 6A:
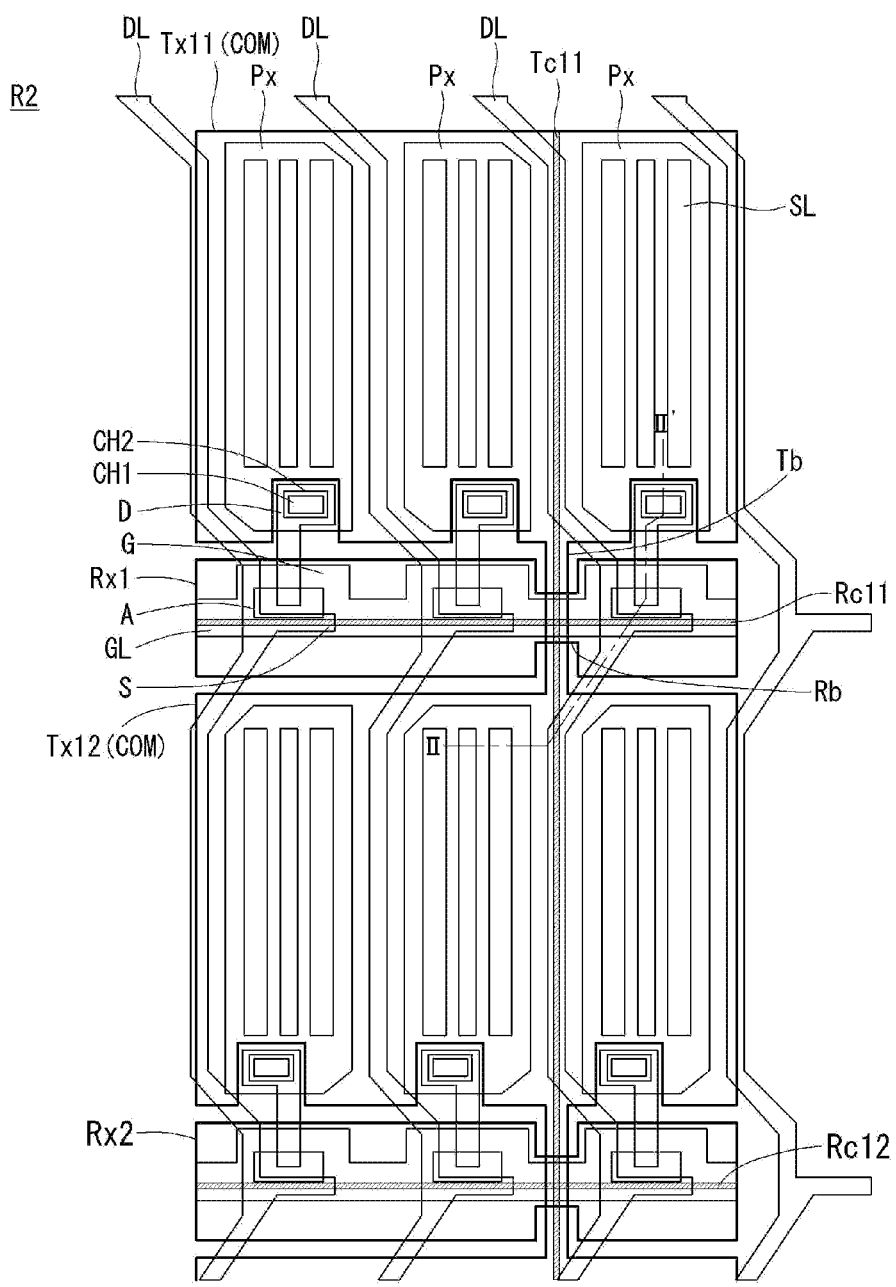
FIG. 6A is a plane view showing an example where a pixel electrode is formed on a common electrode in a region R2 shown in FIG. 3.
Figure 6B:
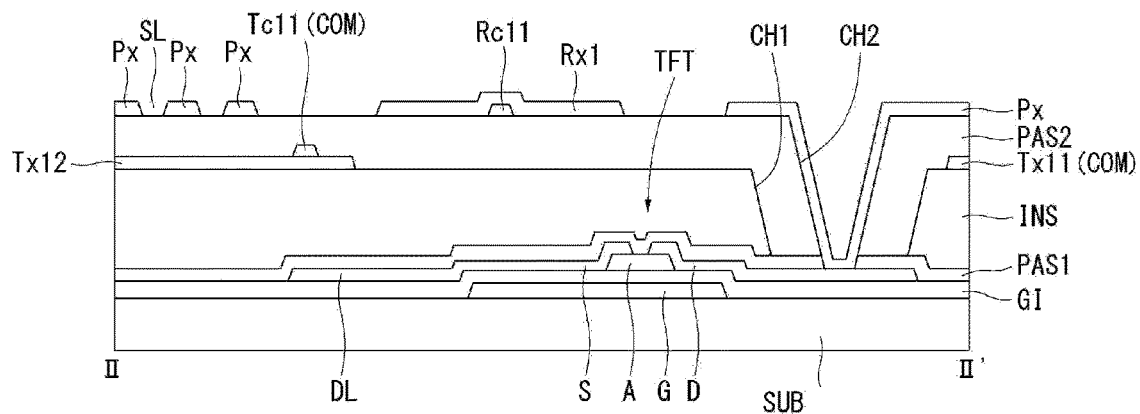
FIG. 6B is a cross-sectional view taken along line II-II' of FIG. 6A.

Next, the touch sensor integrated type display device according to a modification of the first embodiment of the invention, in which the pixel electrode is formed on the common electrode (the touch driving electrode), is described with reference to FIGS. 6A and 6B. FIG. 6A is a plane view showing an example where the pixel electrode is formed on the common electrode in a region R2 shown in FIG. 3. FIG. 6B is a cross-sectional view taken along line II-II' of FIG. 6A.

As shown in FIGS. 4, 6A, and 6B, the touch sensor integrated type display device according to the modification of the first embodiment of the invention includes gate lines GL and data lines DL formed to cross over each other on a substrate SUB1 of a thin film transistor array TFTA, thin film transistors TFT formed at crossings of the gate lines GL and the data lines DL, pixel electrodes Px formed in areas defined by the crossing of the gate lines GL and the data lines DL, and common electrodes COM positioned opposite the pixel electrodes Px. In the modification of the first embodiment of the invention, the common electrodes COM serve as touch driving electrodes Tx in the same manner as the first embodiment of the invention. Thus, the common electrode COM is hereinafter referred to as the touch driving electrode Tx, the touch driving electrode Tx serving as the common electrode, or the common electrode COM serving as the touch driving electrode, if necessary or desired.

In the above configuration of the display device, the gate line GL is formed on the substrate SUB1, and a gate insulating layer GI is formed on the gate line GL. An active layer A, a source electrode S, and a drain electrode D constituting the thin film transistor TFT are formed on the gate insulating layer GI.

Namely, the thin film transistor TFT includes a gate electrode G extended from the gate line GL formed on the substrate SUB1, the active layer A formed in an area corresponding to the gate electrode G on the gate insulating layer GI covering the gate line GL and the gate electrode G, and the source electrode S and the drain electrode D which are separated from each other on the gate insulating layer GI and extend from the data line DL, so as to expose a portion of the active layer A.

The embodiment of the invention has described as an example a thin film transistor having a gate bottom structure, in which the gate electrode is formed under the source and drain electrodes, but is not limited to this example. The embodiment of the invention should be understood that a thin film transistor having a gate top structure, in which the gate electrode is formed on the source and drain electrodes, is available. Since the thin film transistor having the gate top structure is well known, a detailed description thereof will be omitted.

A first passivation layer PAS1 covering the thin film transistor TFT and the data line DL is formed on the gate insulating layer GI, on which the thin film transistor TFT and the data line DL are formed, and an organic insulating layer INS, such as photoacryl, for planarization is formed on the first passivation layer PAS1. A first contact hole CH1 is formed in the organic insulating layer INS and exposes the first passivation layer PAS1 of a position corresponding to a portion of the drain electrode D.

Touch driving electrode patterns Tx11 and Tx12 serving as the common electrode, which are connected to each other through a bottleneck Tb, are formed on the organic insulating layer INS, in which the first contact hole CH1 is formed. A touch driving electrode resistance reducing wire Tc11 is formed on the touch driving electrode patterns Tx11 and Tx12, so that it passes through the bottleneck Tb of the touch driving electrode along the data line DL.

A second passivation layer PAS2 is formed on the organic insulating layer INS, on which the touch driving electrode patterns Tx11 and Tx12 and the touch driving electrode resistance reducing wire Tc11 are formed. A second contact hole CH2 is formed in the first passivation layer PAS1 exposed through the first contact hole CH1 of the organic insulating layer INS and the second passivation layer PAS2 and exposes a portion of the drain electrode D of the thin film transistor TFT.

Touch sensing electrode resistance reducing wires Rc11 and Rc12 are formed on the second passivation layer PAS2, in which the second contact hole CH2 is formed, in a direction (i.e., the x-axis direction) parallel to the gate line GL. Pixel electrodes Px are formed on the second passivation layer PAS2, on which the touch sensing electrode resistance reducing wires Rc11 and Rc12 are formed, and are respectively positioned in pixel areas defined by the crossing of the data lines DL and the gate lines GL. Touch sensing electrodes Rx1 and Rx2 are formed between the pixel electrodes Px, which are adjacent to each other in the y-axis direction, in parallel with the gate line GL, so as to cover the touch sensing electrode resistance reducing wire Rc11. The touch sensing electrodes Rx1 and Rx2 are disposed in a space between the touch driving electrode patterns Tx11 and Tx12. Each of the touch sensing electrodes Rx1 and Rx2 includes a bottleneck Rb at a crossing of the touch sensing electrode and the bottleneck Tb connecting the adjacent touch driving electrode patterns Tx11 and Tx12.

The pixel electrodes Px overlap the touch driving electrode patterns Tx11 and Tx12. Each pixel electrode Px includes a plurality of slits SL, so that a horizontal electric field is easily formed between the pixel electrodes Px and the touch driving electrode patterns Tx11 and Tx12. Thus, the touch driving electrode patterns Tx11 and Tx12 formed on the organic insulating layer INS do not have the slit, and the pixel electrodes Px formed on the second passivation layer PAS2 each have the slits.

The touch sensor integrated type display device according to the first embodiment of the invention and the modification of the first embodiment may obtain an advantage of easily designing the touch driving electrodes, the touch sensing electrodes, and the wires, which constitute the touch sensors, based on the design of the unit pixel electrodes, the gate lines, and the data lines.

Further, because the contact hole for connecting the touch driving electrode and the touch sensing electrode resistance reducing wires is not required in the first embodiment of the invention and the modification of the first embodiment, an aperture ratio of the display device may increase. Hence, the embodiment of the invention may be advantageous to the large-sized products with a high resolution.

Figure 7:
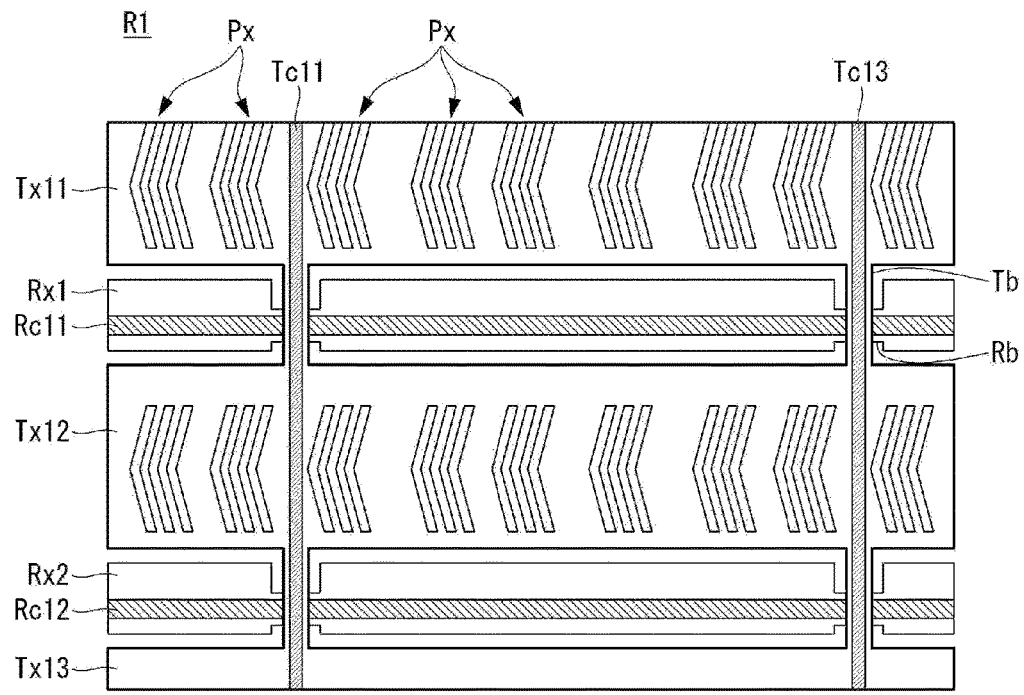
FIG. 7 is a plane view schematically showing a relationship between common electrodes (touch driving electrodes), touch sensing electrodes, and pixel electrodes in a region R1 shown in FIG. 3 in a touch sensor integrated type display device according to a second embodiment of the invention.

Next, a relationship between common electrodes (touch driving electrodes), touch sensing electrodes, and pixel electrodes in a touch sensor integrated type display device according to a second embodiment of the invention is described in detail with reference to FIGS. 2, 3, and 7. FIG. 7 is a plane view schematically showing a relationship between common electrodes (touch driving electrodes), touch sensing electrodes, and pixel electrodes in a region R1 shown in FIG. 3 in the touch sensor integrated type display device according to the second embodiment of the invention.

Configuration of the touch sensor integrated type display device according to the second embodiment of the invention shown in FIG. 7 is substantially the same as the touch sensor integrated type display device according to the first embodiment of the invention shown in FIG. 4, except that middle touch driving electrode resistance reducing wires Tc12 and Tc22 are omitted in touch driving electrode resistance reducing wires Tc11 to Tc13 and Tc21 to Tc23, which are arranged based on the unit pixel electrodes in the first embodiment of the invention, and also a bottleneck Tb of the touch driving electrode and a bottleneck Rb of the touch sensing electrode, through which the middle touch driving electrode resistance reducing wires Tc12 and Tc22 pass, are removed. Therefore, a further description may be briefly made or may be entirely omitted.

Figure 8:
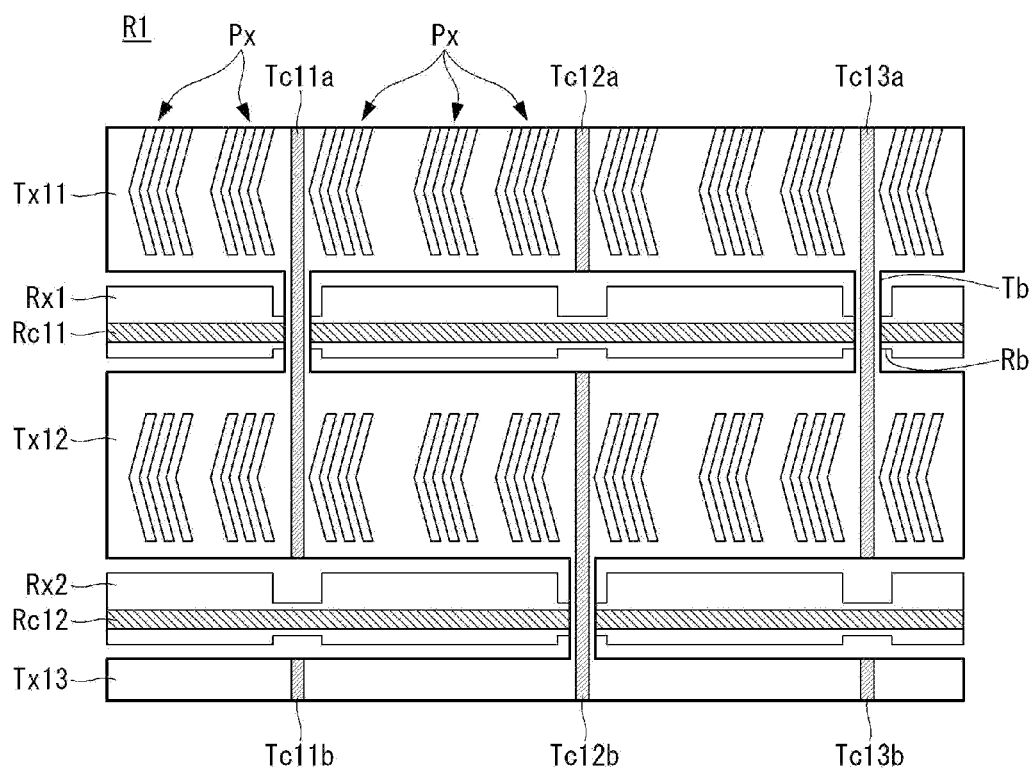
FIG. 8 is a plane view schematically showing a relationship between common electrodes (touch driving electrodes), touch sensing electrodes, and pixel electrodes in a region R1 shown in FIG. 3 in a touch sensor integrated type display device according to a third embodiment of the invention.

Next, a relationship between common electrodes (touch driving electrodes), touch sensing electrodes, and pixel electrodes in a touch sensor integrated type display device according to a third embodiment of the invention is described in detail with reference to FIGS. 2, 3, and 8. FIG. 8 is a plane view schematically showing a relationship between common electrodes (touch driving electrodes), touch sensing electrodes, and pixel electrodes in a region R1 shown in FIG. 3 in the touch sensor integrated type display device according to the third embodiment of the invention.

Configuration of the touch sensor integrated type display device according to the third embodiment of the invention shown in FIG. 8 is substantially the same as the touch sensor integrated type display device according to the first embodiment of the invention shown in FIG. 4, except that each of touch driving electrode resistance reducing wires Tc11 to Tc13 and Tc21 to Tc23, which are arranged based on the unit pixel electrodes in the first embodiment of the invention, does not pass through at least one of touch sensing electrodes, and also a bottleneck Tb of the touch driving electrode crossing a bottleneck Rb of the touch sensing electrode is removed at a position, through which the touch driving electrode resistance reducing wire does not pass. Therefore, a further description may be briefly made or may be entirely omitted.

More specifically, in the touch sensor integrated type display device according to the third embodiment of the invention, touch driving electrode resistance reducing wires Tc11a and Tc11b of a first position in the touch driving electrode resistance reducing wires Tc11 to Tc13 and Tc21 to Tc23 cross a touch sensing electrode Rx1 of an odd-numbered line (or an even-numbered line), but do not cross a touch sensing electrode Rx2 of an even-numbered line (or an odd-numbered line). Touch driving electrode resistance reducing wires Tc12a and Tc12b of a second position cross the touch sensing electrode Rx2 of the even-numbered line (or the odd-numbered line), but do not cross the touch sensing electrode Rx1 of the odd-numbered line (or the even-numbered line). Further, touch driving electrode resistance reducing wires Tc13a and Tc13b of a third position cross the touch sensing electrode Rx1 of the odd-numbered line (or the even-numbered line), but do not cross the touch sensing electrode Rx2 of the even-numbered line (or the odd-numbered line).

In the third embodiment of the invention shown in FIG. 8, the bottleneck Rb of the touch sensing electrode is disposed at a position, through which the touch driving electrode resistance reducing wires Tc12a and Tc12b do not pass, according to the rule. However, the bottleneck Rb may be omitted at the position.

Figure 9:
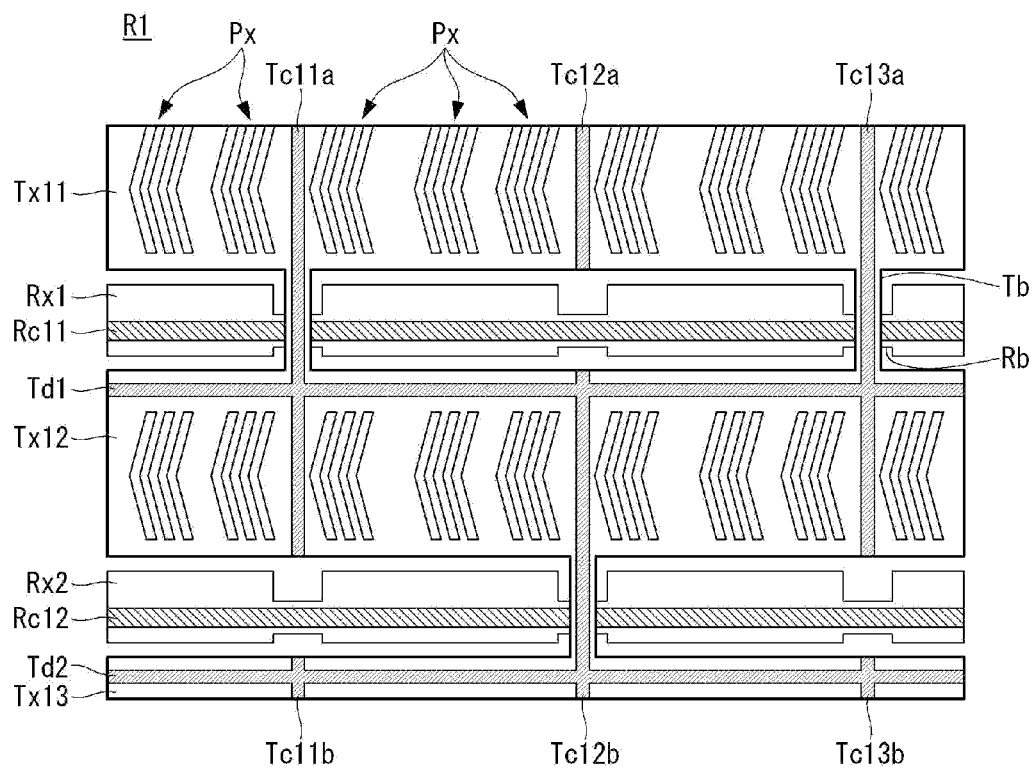
FIG. 9 is a plane view schematically showing a relationship between common electrodes (touch driving electrodes), touch sensing electrodes, and pixel electrodes in a region R1 shown in FIG. 3 in a touch sensor integrated type display device according to a fourth embodiment of the invention.

Next, a relationship between common electrodes (touch driving electrodes), touch sensing electrodes, and pixel electrodes in a touch sensor integrated type display device according to a fourth embodiment of the invention is described in detail with reference to FIGS. 2, 3, and 9. FIG. 9 is a plane view schematically showing a relationship between common electrodes (touch driving electrodes), touch sensing electrodes, and pixel electrodes in a region R1 shown in FIG. 3 in the touch sensor integrated type display device according to the fourth embodiment of the invention.

Configuration of the touch sensor integrated type display device according to the fourth embodiment of the invention shown in FIG. 9 is substantially the same as the touch sensor integrated type display device according to the third embodiment of the invention shown in FIG. 8, except that the display device further includes connection wires Td1 and Td2 for first touch driving electrode resistance reducing wires, which are connected to (or extend from) first touch driving electrode resistance reducing wires Tc11a, Tc12a, Tc13a; and Tc11b, Tc12b, Tc13b, on the same layer, which are disposed on one side (an upper side or a lower side in FIG. 9) of pixel electrodes Px of one line disposed corresponding to each of touch driving electrode patterns Tx11, Tx12, and Tx13 and pass through the touch driving electrode patterns Tx11, Tx12, and Tx13. Therefore, a further description may be briefly made or may be entirely omitted.

Figure 10:
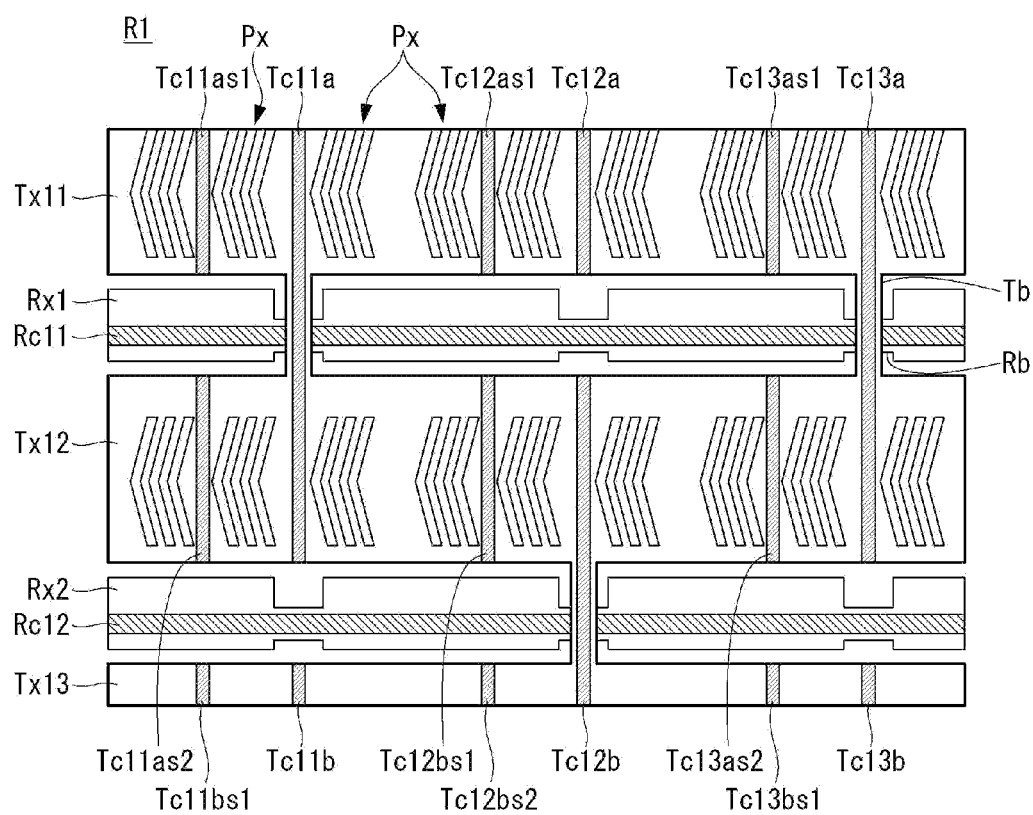
FIG. 10 is a plane view schematically showing a relationship between common electrodes (touch driving electrodes), touch sensing electrodes, and pixel electrodes in a region R1 shown in FIG. 3 in a touch sensor integrated type display device according to a fifth embodiment of the invention.

Next, a relationship between common electrodes (touch driving electrodes), touch sensing electrodes, and pixel electrodes in a touch sensor integrated type display device according to a fifth embodiment of the invention is described in detail with reference to FIGS. 2, 3, and 10. FIG. 10 is a plane view schematically showing a relationship between common electrodes (touch driving electrodes), touch sensing electrodes, and pixel electrodes in a region R1 shown in FIG. 3 in the touch sensor integrated type display device according to the fifth embodiment of the invention.

Configuration of the touch sensor integrated type display device according to the fifth embodiment of the invention shown in FIG. 10 is substantially the same as the touch sensor integrated type display device according to the third embodiment of the invention shown in FIG. 8, except that the display device further includes first auxiliary touch driving electrode resistance reducing wires Tc11as1, Tc12as1, Tc13as1; Tc11as2, Tc12bs1, Tc13as2; and Tc11bs1, Tc12bs2, Tc13bs1 which are positioned adjacent to first touch driving electrode resistance reducing wires Tc11a, Tc12a, Tc13a; and Tc11b, Tc12b, Tc13b in touch driving electrode patterns Tx11, Tx12, and Tx13. Therefore, a further description may be briefly made or may be entirely omitted.

More specifically, in the first auxiliary touch driving electrode resistance reducing wires Tc11as1, Tc12as1, Tc13as1; Tc11as2, Tc12bs1, Tc13as2; and Tc11bs1, Tc12bs2, Tc13bs1, the wires Tc11as1, Tc12as1, and Tc13as1 are formed inside, for example, the touch driving electrode pattern Tx11 and are disposed in parallel with the touch driving electrode resistance reducing wires Tc11a, Tc12a, and Tc13a with the pixel electrodes Px interposed therebetween. The wires Tc11as2, Tc12bs1, and Tc13as2 are formed inside, for example, the touch driving electrode pattern Tx12 and are disposed in parallel with the touch driving electrode resistance reducing wires Tc11a, Tc12b, and Tc13a with the pixel electrodes Px interposed therebetween. The wires Tc11bs1, Tc12bs2, and Tc13bs1 are formed inside, for example, the touch driving electrode pattern Tx13 and are disposed in parallel with the touch driving electrode resistance reducing wires Tc11b, Tc12b, and Tc13b with the pixel electrodes Px interposed therebetween.

Figure 11:
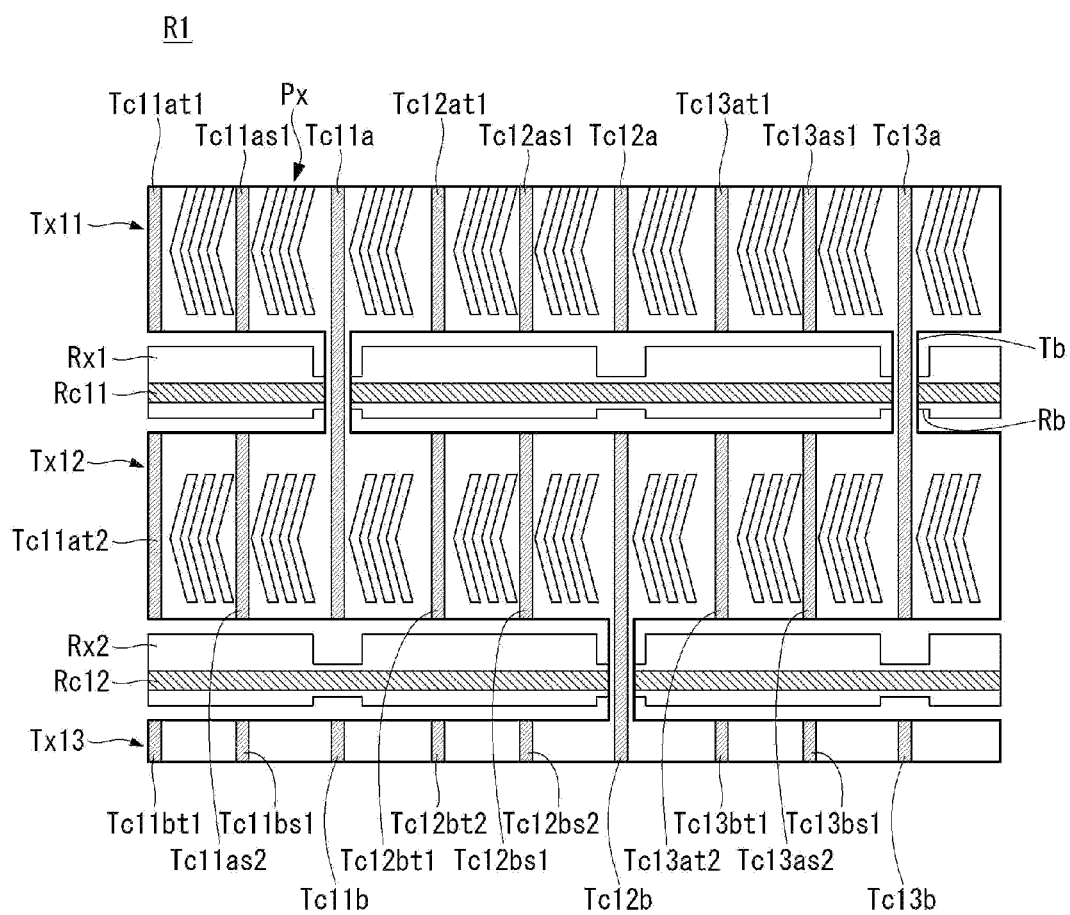
FIG. 11 is a plane view schematically showing a relationship between common electrodes (touch driving electrodes), touch sensing electrodes, and pixel electrodes in a region R1 shown in FIG. 3 in a touch sensor integrated type display device according to a sixth embodiment of the invention.

Next, a relationship between common electrodes (touch driving electrodes), touch sensing electrodes, and pixel electrodes in a touch sensor integrated type display device according to a sixth embodiment of the invention is described in detail with reference to FIGS. 2, 3, and 11. FIG. 11 is a plane view schematically showing a relationship between common electrodes (touch driving electrodes), touch sensing electrodes, and pixel electrodes in a region R1 shown in FIG. 3 in the touch sensor integrated type display device according to the sixth embodiment of the invention.

Configuration of the touch sensor integrated type display device according to the sixth embodiment of the invention shown in FIG. 11 is substantially the same as the touch sensor integrated type display device according to the fifth embodiment of the invention shown in FIG. 10, except that the display device further includes second auxiliary touch driving electrode resistance reducing wires Tc11at1, Tc12at1, Tc13at1; Tc11at2, Tc12bt1, Tc13at2; and Tc11bt1, Tc12bt2, Tc13bt1 which are positioned adjacent to first auxiliary touch driving electrode resistance reducing wires Tc11as1, Tc12as 1, Tc13as1; Tc11as2, Tc12bs1, Tc13as2; and Tc11bs1, Tc12bs2, Tc13bs1 in touch driving electrode patterns Tx11, Tx12, and Tx13. Therefore, a further description may be briefly made or may be entirely omitted.

More specifically, in the second auxiliary touch driving electrode resistance reducing wires Tc11at1, Tc12at1, Tc13at1; Tc11at2, Tc12bt1, Tc13at2; and Tc11bt1, Tc12bt2, Tc13bt1, the wires Tc11at1, Tc12at1, and Tc13at1 are formed inside, for example, the touch driving electrode pattern Tx11 and are disposed in parallel with the first auxiliary touch driving electrode resistance reducing wires Tc11as1, Tc12as1, and Tc13as1 with the pixel electrode Px interposed therebetween. The wires Tc11at2, Tc12bt1, and Tc13at2 are formed inside, for example, the touch driving electrode pattern Tx12 and are disposed in parallel with the first auxiliary touch driving electrode resistance reducing wires Tc11as2, Tc12bs1, and Tc13as2 with the pixel electrode Px interposed therebetween. The wires Tc11bt1, Tc12bt2, and Tc13bt1 are formed inside, for example, the touch driving electrode pattern Tx13 and are disposed in parallel with the first auxiliary touch driving electrode resistance reducing wires Tc11bs1, Tc12bs2, and Tc13bs1 with the pixel electrode Px interposed therebetween.

Figure 12:
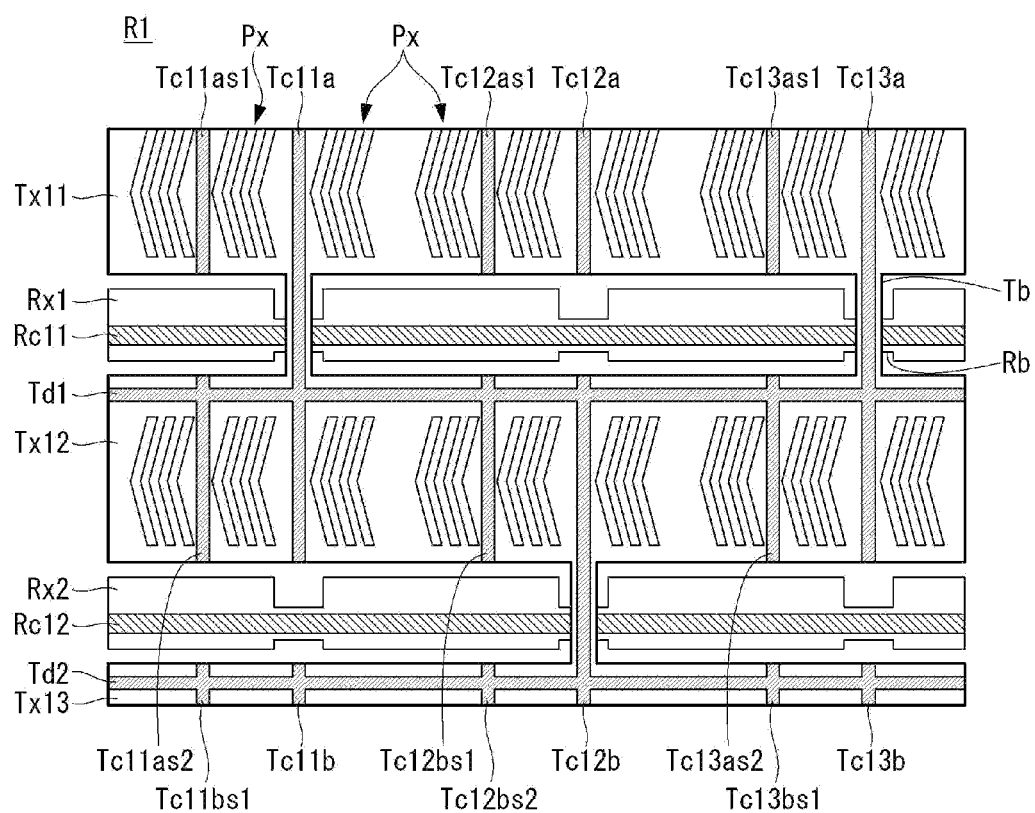
FIG. 12 is a plane view schematically showing a relationship between common electrodes (touch driving electrodes), touch sensing electrodes, and pixel electrodes in a region R1 shown in FIG. 3 in a touch sensor integrated type display device according to a seventh embodiment of the invention.

Next, a relationship between common electrodes (touch driving electrodes), touch sensing electrodes, and pixel electrodes in a touch sensor integrated type display device according to a seventh embodiment of the invention is described in detail with reference to FIGS. 2, 3, and 12. FIG. 12 is a plane view schematically showing a relationship between common electrodes (touch driving electrodes), touch sensing electrodes, and pixel electrodes in a region R1 shown in FIG. 3 in the touch sensor integrated type display device according to the seventh embodiment of the invention.

Configuration of the touch sensor integrated type display device according to the seventh embodiment of the invention shown in FIG. 12 is substantially the same as the touch sensor integrated type display device according to the fourth embodiment of the invention shown in FIG. 9, except that the display device further includes first auxiliary touch driving electrode resistance reducing wires Tc11as1, Tc12as1, Tc13as1; Tc11as2, Tc12bs1, Tc13as2; and Tc11bs1, Tc12bs2, Tc13bs1 which are positioned adjacent to first touch driving electrode resistance reducing wires Tc11a, Tc12a, Tc13a; and Tc11b, Tc12b, Tc13b in touch driving electrode patterns Tx11, Tx12, and Tx13. Therefore, a further description may be briefly made or may be entirely omitted.

More specifically, in the first auxiliary touch driving electrode resistance reducing wires Tc11as1, Tc12as1, Tc13as1; Tc11as2, Tc12bs1, Tc13as2; and Tc11bs1, Tc12bs2, Tc13bs1, the wires Tc11as1, Tc12as1, and Tc13as1 are formed inside, for example, the touch driving electrode pattern Tx11 and are disposed in parallel with the touch driving electrode resistance reducing wires Tc11a, Tc12a, and Tc13a with the pixel electrodes Px interposed therebetween. The wires Tc11as2, Tc12bs1, and Tc13as2 are formed inside, for example, the touch driving electrode pattern Tx12 and are disposed in parallel with the touch driving electrode resistance reducing wires Tc11a, Tc12b, and Tc13a with the pixel electrodes Px interposed therebetween. The wires Tc11bs1, Tc12bs2, and Tc13bs1 are formed inside, for example, the touch driving electrode pattern Tx13 and are disposed in parallel with the touch driving electrode resistance reducing wires Tc11b, Tc12b, and Tc13b with the pixel electrodes Px interposed therebetween.

Figure 13:
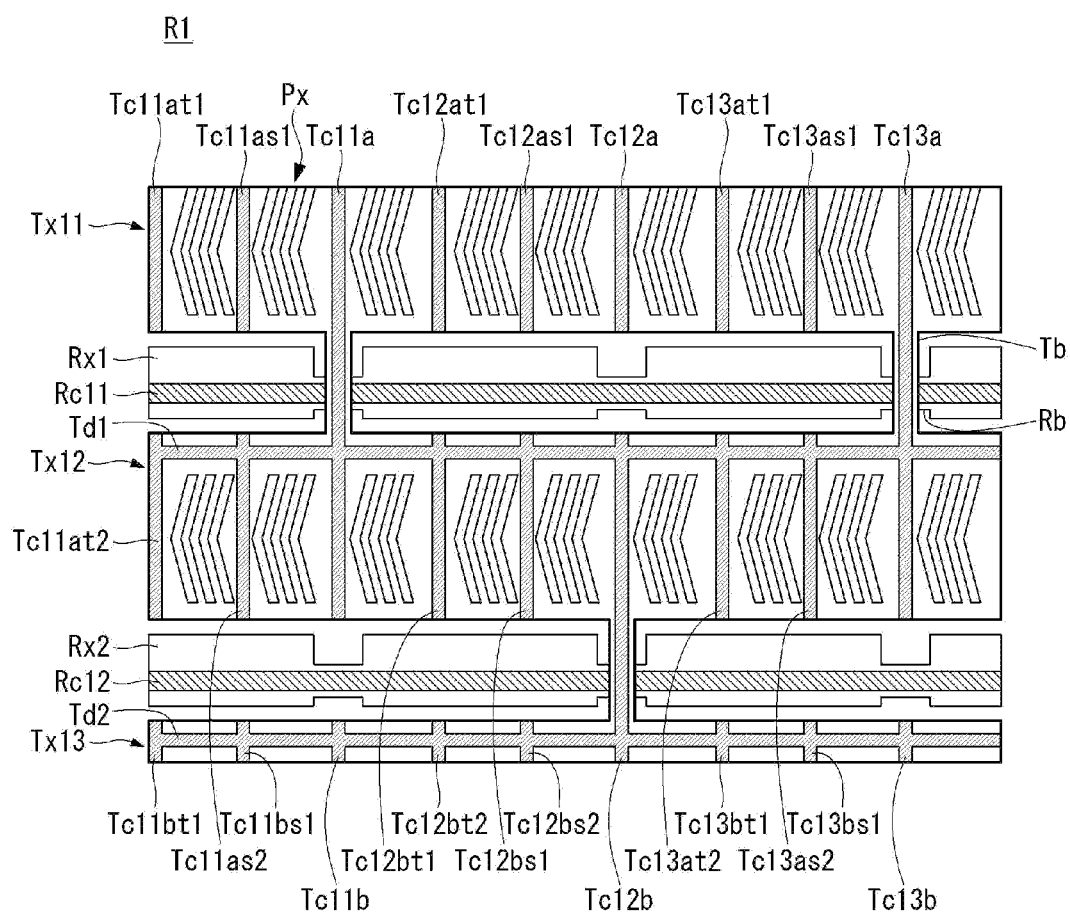
FIG. 13 is a plane view schematically showing a relationship between common electrodes (touch driving electrodes), touch sensing electrodes, and pixel electrodes in a region R1 shown in FIG. 3 in a touch sensor integrated type display device according to an eighth embodiment of the invention.

Next, a relationship between common electrodes (touch driving electrodes), touch sensing electrodes, and pixel electrodes in a touch sensor integrated type display device according to an eighth embodiment of the invention is described in detail with reference to FIGS. 2, 3, and 13. FIG. 13 is a plane view schematically showing a relationship between common electrodes (touch driving electrodes), touch sensing electrodes, and pixel electrodes in a region R1 shown in FIG. 3 in the touch sensor integrated type display device according to the eighth embodiment of the invention.

Configuration of the touch sensor integrated type display device according to the eighth embodiment of the invention shown in FIG. 13 is substantially the same as the touch sensor integrated type display device according to the sixth embodiment of the invention shown in FIG. 11, except that the display device further includes connection wires Td1 and Td2 for first touch driving electrode resistance reducing wires, which are connected to (or extend from) first touch driving electrode resistance reducing wires Tc11a, Tc12a, Tc13a; and Tc11b, Tc12b, Tc13b, first auxiliary touch driving electrode resistance reducing wires Tc11as2, Tc12bs1, Tc13as2; and Tc11bs1, Tc12bs2, Tc13bs1, and second auxiliary touch driving electrode resistance reducing wires Tc11at2, Tc12bt1, Tc13at2; and Tc11bt1, Tc12bt2, Tc13bt1, on the same layer, which are disposed on one side (an upper side or a lower side in FIG. 13) of pixel electrodes Px of one line disposed corresponding to each of touch driving electrode patterns Tx11, Tx12, and Tx13 and pass through the touch driving electrode patterns Tx11, Tx12, and Tx13. Therefore, a further description may be briefly made or may be entirely omitted.

As described above, in the touch sensor integrated type display device according to the first to eighth embodiments of the invention, the relationship between the touch driving electrodes, the touch sensing electrodes, and the wires, which constitute the touch sensors, can be easily designed based on the design of the unit pixel electrodes, the gate lines, and the data lines of the display device.

Further, because the contact hole for connecting the touch driving electrode and the touch sensing electrode connection wires is not required in the embodiments of the invention, an aperture ratio of the display device may increase. Hence, the embodiments of the invention can be advantageous to the large-sized products with a high resolution.

Further, in the touch sensor integrated type display device according to the second to eighth embodiments of the invention, because the touch driving electrodes and the touch driving electrode resistance reducing wires are not disposed in a portion of the touch sensing area, the mutual capacitance between the touch driving electrode and the touch sensing electrode and the parasitic capacitance generated between the touch sensor and the signal wires of the display device may be reduced. Thus, the touch sensitivity of the display device may be improved.

Although embodiments have been described with reference to a number of illustrative embodiments thereof, it should be understood that numerous other modifications and embodiments can be devised by those skilled in the art that will fall within the scope of the principles of this disclosure.

For example, the embodiment of the invention described the pixel electrodes disposed at the touch sensing electrode and the touch non-sensing electrode as the plurality of unit pixel electrodes, but is not limited thereto. One unit pixel electrode may be used.

Further, in the embodiments of the invention, the touch driving electrode may be used as the touch sensing electrode, and the touch sensing electrode may be used as the touch driving electrode.

Further, in the embodiments of the invention, the first passivation layer for protecting the thin film transistor and the organic insulating layer for the planarization are individually formed. However, one of the first passivation layer and the organic insulating layer may perform the two functions of the protection and the planarization.

Further, in the second embodiment of the invention, the size of the touch sensing area is about two times the size of the touch driving area. However, the embodiment of the invention is not limited thereto, and the size of the touch sensing area may be n times the size of the touch driving area, where n is a natural number equal to or greater than 2.

Thus, it will be apparent to those skilled in the art that various modifications and variations can be made in the touch sensor integrated type display device of the present invention without departing from the spirit or scope of the invention. Thus, it is intended that the present invention cover the modifications and variations of this invention provided they come within the scope of the appended claims and their equivalents.

What is claimed is:

1. A touch sensor integrated type display device, comprising:
   a plurality of first electrodes arranged in a first direction, each of the plurality of first electrodes including a plurality of first electrode patterns that extend in a second direction, each of the plurality of first electrode patterns being disposed corresponding to at least one unit pixel electrode, wherein adjacent ones of the plurality of first electrode patterns in the first direction are connected through a plurality of first bottlenecks; and
   a plurality of second electrodes arranged in a second direction, each of the plurality of second electrodes is disposed between two pixel electrodes which are neighbored to each other in the first direction,
   wherein each of the plurality of second electrodes is overlapped by respective ones of the plurality of first bottlenecks,
   wherein the plurality of first electrode patterns and the plurality of second electrodes are alternatively disposed in the second direction;
   wherein a plurality of first electrode resistance reducing wires arranged in the first direction and configured to contact the plurality of first electrode patterns and pass through respective ones of the plurality of the first bottlenecks,
   wherein the plurality of first electrodes are one of touch driving electrodes and touch sensing electrodes, and serve as divided common electrodes, and
   wherein the plurality of second electrodes are touch sensing electrodes when the plurality of first electrodes are touch driving electrodes serving as the divided common electrodes, or the plurality of second electrodes are touch driving electrodes when the plurality of first electrodes are touch sensing electrodes serving as the divided common electrodes.

2. The touch sensor integrated type display device of claim 1, wherein the plurality of first bottlenecks are disposed one to n unit pixel electrodes, where n is a natural number.

3. The touch sensor integrated type display device of claim 2, wherein the plurality of first electrode resistance reducing wires pass through a formation position of the plurality of first bottlenecks and are disconnected at a non-formation position of the plurality of first bottlenecks.

4. The touch sensor integrated type display device of claim 3, further comprising a connection wire which connects the plurality of first electrode resistance reducing wires corresponding to at least one of the plurality of first electrodes and is arranged in the second direction.

5. The touch sensor integrated type display device of claim 1, wherein each of the plurality of second electrodes includes a second bottleneck having a narrow width at each crossing of the first bottleneck and the second electrode.

6. The touch sensor integrated type display device of claim 5, further comprising a plurality of second electrode resistance reducing wires configured to contact the plurality of second electrode patterns, cross the first bottleneck and pass through the second bottleneck.

7. The touch sensor integrated type display device of claim 1, wherein only the plurality of first electrodes serve as the divided common electrodes.

* * * * *